US011057128B1

(12) United States Patent
Geiger et al.

(10) Patent No.: US 11,057,128 B1
(45) Date of Patent: Jul. 6, 2021

(54) LOCATIONING BASED ON CHANNEL-SPECIFIC GAIN

(71) Applicant: ZEBRA TECHNOLOGIES CORPORATION, Lincolnshire, IL (US)

(72) Inventors: Edward W. Geiger, San Martin, CA (US); Janakiraman Gopalan, Cupertino, CA (US); Yu Wan, Cupertino, CA (US); Richard Lawerance Woodburn, Cupertino, CA (US); Thomas E. Warner, Moraga, CA (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 16/715,654

(22) Filed: Dec. 16, 2019

(51) Int. Cl.
*H04B 17/27* (2015.01)
*H04B 17/318* (2015.01)

(52) U.S. Cl.
CPC ........ *H04B 17/27* (2015.01); *H04B 17/318* (2015.01)

(58) Field of Classification Search
CPC ........ H04W 4/23; H04W 4/02; H04W 4/14; H04W 4/80; H04W 4/90; H04W 4/30; H04W 4/33; H04W 4/35; H04W 4/21; H04W 4/021; H04W 4/023; H04W 4/029; H04W 4/025; H04W 4/06; H04W 64/00; H04W 88/02; H04W 4/08; H04W 4/50; H04W 4/60; H04W 4/70; H04W 76/00; H04W 76/50; H04W 76/40; H04W 76/11; H04W 72/04; H04W 72/00; H04W 12/00503; H04W 12/00524; H04W 72/12; H04W 72/1205; H04W 72/121; H04W 72/1226; H04W 72/1231; H04W 72/1263; H04W 74/04; H04W 74/00; H04W 88/00; H04W 88/08; H04W 88/18; H04B 17/27; H04B 17/318; H04B 7/0632; H04B 17/21; H04B 17/327; H04B 17/336; H04B 10/50; H04B 17/10; H04B 17/11; H04B 17/20; G06Q 30/0241; G06Q 30/0242; G06Q 30/0244; G06Q 30/0251; G06Q 30/0265; G06Q 30/0266; G06Q 30/0267; G06Q 30/0268; H04M 3/4878; H04M 11/022; H04H 60/49; H04H 20/57; H04H 20/59; H04H 20/61
See application file for complete search history.

(56) References Cited

U.S. PATENT DOCUMENTS

| | | | |
|---|---|---|---|
| 7,899,006 B2 | 3/2011 | Boyd | |
| 9,973,226 B2 * | 5/2018 | Nakanishi | ............ H04B 1/1615 |
| 10,310,052 B2 | 6/2019 | Richley et al. | |
| 10,591,578 B2 | 3/2020 | O'Hagan et al. | |
| 2013/0065584 A1 * | 3/2013 | Lyon et al. | .................. 455/434 |

(Continued)

*Primary Examiner* — Meless N Zewdu

(57) ABSTRACT

A wireless communication device may determine that a channel is to be used to transmit an advertisement. The wireless communication device may determine a channel-specific gain associated with transmitting the advertisement via the channel. The wireless communication device may generate the advertisement to include information identifying a channel identifier of the channel and the channel-specific gain. The wireless communication device may transmit the advertisement for locationing based on a received signal strength indicator (RSSI) of the advertisement.

20 Claims, 9 Drawing Sheets

(56) References Cited

U.S. PATENT DOCUMENTS

| | | | |
|---|---|---|---|
| 2013/0077502 A1* | 3/2013 | Gainey et al. | 370/252 |
| 2015/0305120 A1* | 10/2015 | Wong et al. | H05B 37/0218 |
| 2017/0086204 A1* | 3/2017 | Jung et al. | H04W 72/082 |
| 2019/0037473 A1* | 1/2019 | Taneja | H04W 40/246 |
| 2019/0332835 A1 | 10/2019 | Sankhavaram et al. | |

\* cited by examiner

LOCATIONING BASED ON CHANNEL-SPECIFIC GAIN

FIELD OF THE DISCLOSURE

This disclosure relates generally to locationing and, for example, to a locationing analysis based on channel-specific gain.

BACKGROUND

Short range wireless communication enables wireless communication over relatively short distances (e.g., within 30 meters). For example, BLUETOOTH® is a wireless technology standard for exchanging data over short distances using short-wavelength ultra high frequency (UHF) radio waves from 2.4 gigahertz (GHz) to 2.485 GHz. BLUETOOTH® Low Energy (BLE) is a form of BLUETOOTH® communication that allows for communication with devices running on low power. Such devices may include beacons, which are wireless communication devices that may use low-energy communication technology for locationing, proximity marketing, and/or the like. The beacons may advertise and/or transmit information to wireless communication devices for locationing (e.g., to enable a location of the wireless communication device to be determined).

DETAILED DESCRIPTION

Figure 1A:
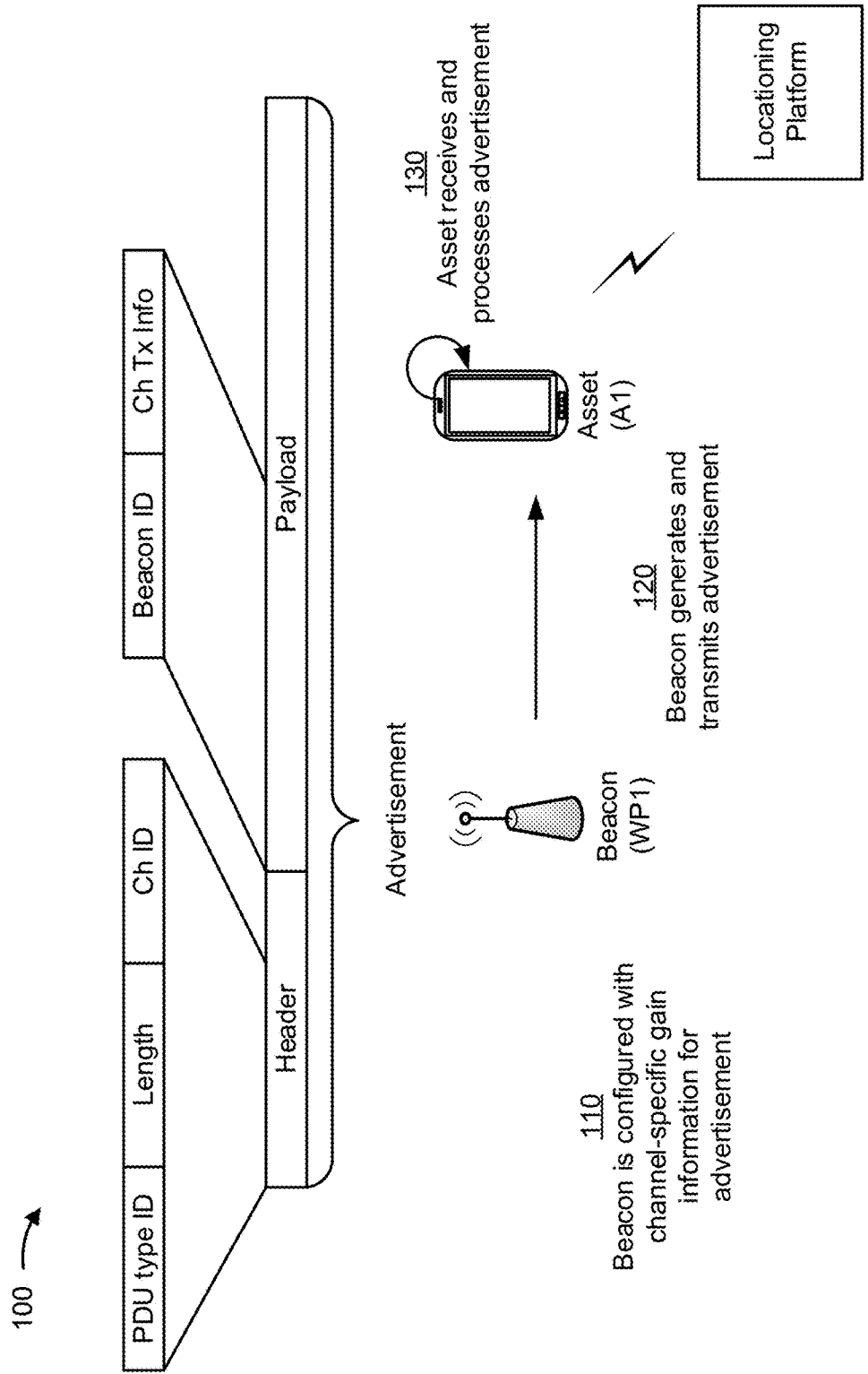
FIGS. 1A-1D are diagrams of one or more example implementations described herein.

The following detailed description of example implementations refers to the accompanying drawings. The same reference numbers in different drawings may identify the same or similar elements.

In some instances, a wireless communication device may use a received signal strength indicator (RSSI) measurement of a received advertisement (e.g., an advertisement packet or signal from another wireless communication device, such as a beacon) for locationing. For example, a value of the RSSI measurement of the received advertisement may correlate to a distance between the wireless communication device that received the advertisement (which may be referred to as the "receiver") and a wireless communication device that transmitted the advertisement (which may be referred to as the "transmitter"). The advertisement may include an identifier of the transmitter, which may be processed by the receiver and/or another device (e.g., a locationing platform) to determine a location of the receiver based on identifying a predetermined location of the transmitter.

Use of an RSSI measurement for locationing of wireless communication devices (e.g., short range wireless communication devices, such as BLUETOOTH® devices, BLUETOOTH® Low Energy (BLE) devices, and/or the like) can be prone to error. For example, gains of a transmitter and/or a receiver may distort the RSSI measurement due to antenna configurations, electronics path loss, power setting tolerances, and/or the like. Accordingly, in some instances, advertisements from a transmitter may include information that identifies a transmitter gain. While an RSSI measurement of an advertisement can be adjusted according to the transmit antenna gain (and/or a receiver antenna gain of the receiver), antenna gains of transmitters and/or receivers may vary across different channels. For example, an antenna gain for a high channel may differ from an antenna gain for a low channel by a magnitude of 8 decibel milliwatts or more (dBm), which then can affect the accuracy of locationing using the RSSI measurement. However, previous techniques for locationing using RSSI measurement are based on an average antenna gain (whether transmitter gain or receiver gain) across any or all channels used to transmit or receive advertisements. Some previous techniques may address the difference in gain across various channels by only transmitting or receiving via a single channel so that the antenna gain is not variable. However, a wireless communication device that uses a single channel risks interference with other wireless communication devices (e.g., other beacons within range of the transmitter) and/or communications of other communication technologies (e.g., wireless local area network (WLAN) communication technologies) that may use the same channel.

According to some implementations described herein, a wireless communication device may utilize channel-specific gain of a transmitter antenna and/or a receiver antenna to determine an RSSI measurement and/or perform locationing. In some implementations, the wireless communication device may identify a channel associated with an advertisement of a beacon; determine channel-specific gain associated with the beacon and the channel; and determine an RSSI measurement, for locationing, using the channel-specific gain.

For example, as described herein, a beacon may be configured to include information that identifies the channel and/or the channel-specific transmitter gain (corresponding to the gain of the beacon) in the advertisement to permit a receiver and/or locationing platform to determine a location of a wireless communication device using the channel-specific transmitter gain. Additionally, or alternatively, a receiver of the advertisement may identify the channel and/or the channel-specific gain of the advertisement by processing the advertisement, identifying the channel to determine a channel-specific receiver gain and/or a channel-specific transmitter gain, to determine a location of the receiver and/or permit a locationing platform to determine the location of the receiver. Further, in some implementations, a locationing platform may receive channel-specific gain information (e.g., including information identifying a channel, a channel-specific transmitter gain and/or a channel-specific receiver gain) from a wireless communication device (e.g., a receiver of an advertisement) and determine a location of the wireless communication device based on the channel-specific gain information.

In this way, a wireless communication device may utilize channel-specific gain to accurately determine an RSSI measurement of an advertisement that can be used to more accurately perform locationing involving the wireless communication device, relative to previous techniques. Furthermore, a wireless communication device, as described herein, may utilize multiple channels (e.g., across different channels of the 2.4 gigahertz (GHz) band) to transmit or receive an advertisement, while enabling improved locationing accuracy, relative to previous techniques, by specifying the utilized channel of the advertisement to enable identification of channel-specific gain for an RSSI measurement. Accordingly, utilization of channel-specific gain for locationing, as described herein, reduces potential for interference caused by or involving advertisements used for locationing, and correspondingly, reduces wasted resources (e.g., computing resources, network resources, power resources, and/or the like) consumed by advertisements that cause interference or are disrupted by interfering communications. Moreover, the improved locationing accuracy permits a wireless communication device and/or locationing platform to more accurately determine a location of the wireless communication device (which may be associated with a particular tracked asset or object of interest). Therefore, a wireless communication device that utilizes channel-specific gain, as described herein, may improve accuracy of a tracking operation associated with an asset that is associated the wireless communication device, improve safety associated with the asset (e.g., by detecting potential collisions between the asset and other objects), reduce wasted resources (e.g., computing resources, network resources, power resources, and/or the like) consumed by addressing locationing that is performed without considering channel-specific gain, and/or the like.

FIGS. 1A-1D are diagrams of an example implementation 100 described herein. As shown in FIGS. 1A-1D, example implementation 100 includes a beacon (identified by "WP1"), an asset (identified by "A1"), and a locationing platform. The beacon may be a short range wireless communication device (e.g., a BLE transmitter) that is positioned at a waypoint, which may include coordinates and/or identification of a particular location (e.g., that has previously been communicated (or is known) to the asset and/or locationing platform). The asset may be or may include a short range wireless communication device. For example, the asset may be a mobile device used to track a location of an object of interest (e.g., an individual, a product or inventory, a manufacturing machine, a transportation machine, and/or the like). The locationing platform may be a device (e.g., a user device, a server device, and/or the like) that is configured to perform locationing associated with the beacon and/or the asset (e.g., determine a location of the asset relative to the beacon).

The beacon, asset, and/or locationing platform of example implementation 100 provide improved accuracy of locationing of the asset based on determining an RSSI measurement of an advertisement according to the channel-specific gain associated with transmitting or receiving the advertisement via a specific channel. As described herein, locationing involves one or more processes that may be performed to identify, determine, and/or provide information that identifies, represents, or may be used to determine a location of an object, such as the asset of example implementation 100. For example, locationing may involve determining a distance from a known location (e.g., using a measurement of an RSSI of an advertisement of a beacon) and/or determining a location (e.g., using triangulation or other similar techniques) according to the distance and/or known location. As described herein, an advertisement may be communicated using a communication structure, such as a protocol data unit (PDU), a packet, a frame, a datagram, a segment, a message, a block, a cell, a frame, a subframe, a slot, a symbol, a portion of any of the above, and/or another type of formatted or unformatted unit of data capable of being wirelessly transmitted.

Although example implementation 100 is described in connection with a single beacon and an asset, similar operations may be performed in association with the asset and a plurality of beacons (e.g., simultaneously or within a same time period to enable triangulation or other locationing operations to be performed).

As shown in FIG. 1A, and by reference number 110, the beacon is configured with channel-specific gain information for the advertisement. For example, the beacon may be configured to generate and transmit the advertisement with the channel-specific gain information during design, manufacture, and/or calibration of the beacon. In some implementations, the beacon may be configured according to a user input, control information, and/or instructions from the locationing platform.

As shown, the advertisement includes a header and a payload. The header may include a protocol data unit (PDU) type field ("PDU Type ID"), a length field, and a channel identifier field ("Ch ID"). The PDU type field may indicate a type, purpose, format, and/or the like of the advertisement. For example, the PDU type identifier may indicate that the advertisement is to be used for locationing. The length field may indicate a length of the advertisement and/or the payload of the advertisement. In some implementations, the channel identifier is two bits of the header. For example, if the advertisement is to be transmitted via a low channel, a middle channel, and a high channel, the channel identifier for the low channel may be "01," the channel identifier for the middle channel may be "10," and the channel identifier for the high channel may be "11." In some implementations, the channel identifier may indicate when a channel cannot be determined or identified (e.g., "00" in connection with the example above).

The payload may include a beacon identifier ("Beacon ID") of the beacon and a channel-specific transmitter information ("Ch Tx Info"). The beacon identifier may include a name of the beacon (e.g., "WP1"), a media access control (MAC) identifier (MAC ID) or MAC address, a serial number, a make/manufacturer identifier, a model identifier, and/or the like. As described herein, the channel-specific transmitter information may correspond to a transmitter gain (or transmission power information that is associated with and/or representative of a transmitter gain) of the beacon (e.g., a gain caused by an antenna configuration, path loss, power setting tolerance, and/or the like). Other configurations of the advertisement and/or additional data associated with the beacon may be included in the advertisement.

The beacon may be configured to transmit the advertisement according to a schedule. For example, the schedule may indicate timing information (e.g., a fixed time period or variable set of time periods between transmissions of the advertisement) that identifies when the advertisement is to be transmitted and/or channel information that identifies on which channel the advertisement is to be transmitted. According to the schedule, the beacon may transmit the advertisement with the same beacon identifier at various times and via various channels. In some implementations, the schedule may be configured such that the beacon is to rotate transmission of the advertisement via a low channel, a middle channel, and a high channel (e.g., corresponding to channel 37, channel 38, and channel 39 of the 2.4 GHz band). A rotation of the schedule may correspond to a particular sequence (or may be sequential), may be random, or may be a combination of sequential and random (e.g., sequential during certain time periods and random during other time periods). In this way, the beacon may transmit the advertisement via a channel identified by a schedule and with timing identified by the schedule. The schedule may be fixed (e.g., in a read-only memory configured during manufacture) and/or adjustable (e.g., based on control information or instructions from the locationing platform).

The beacon may be configured to generate the advertisement during a process of calibrating and/or manufacturing the beacon. For example, during a transmitter calibration of the beacon, information associated with a transmitter gain of the beacon may be determined for each channel that is to be used to transmit the beacon. The transmitter gain may be determined, during the transmitter calibration, using any suitable technique. For example, a transmitter calibration may include obtaining an RSSI reading or measuring the RSSI of a transmitted signal at a particular distance (e.g., one meter, two meters, five meters, and/or the like) from the antenna of the beacon. Additionally, or alternatively, the transmitter calibration may include determining an average RSSI reading of a plurality of transmitted signals via individual channels at the particular distance from the antenna of the beacon to determine the channel-specific transmitter gain. For example, an RSSI reading (or plurality of RSSI readings) can be captured at one meter for each channel. Accordingly, if a particular free space path loss for a channel is 40 dBm (or known to be 40 dBm) and the RSSI measured at one meter is −50 dBm, then the transmitter gain may be determined to be −10 dBm. As such, the channel-specific transmitter information may include the transmitter gain for the channel (−10 dBm) and/or the RSSI reading for the channel at one meter from the beacon (−50 dBm). Accordingly, the channel-specific information may be included within the advertisement to permit a receiving device (e.g., the asset and/or the locationing platform) to determine a gain associated with transmission of the advertisement.

The beacon may be configured to store a value of the transmitter gain, for each channel that is to be used to transmit the advertisement, in a calibration mapping in a data structure of the beacon. For example, the calibration mapping may map channel identifiers of individual channels to corresponding channel-specific transmitter gains of the transmitter antenna. In some implementations, the calibration mapping may include a default value for a transmitter gain. For example, when a channel for transmission of an advertisement cannot be determined or identified (and/or when an error occurs), the default value (e.g., an average of the channel-specific transmitter gains, a channel-specific transmitter gain for a middle channel, and/or the like) may be used for the transmitter gain. The mapping may be specific to the beacon of example implementation 100 (of WP1) or may be based on a type of the beacon (e.g., corresponding to a certain make, manufacture, or model of the beacon). Accordingly, the beacon may refer to the calibration mapping (e.g., perform a lookup operation to find the channel identifier in the calibration mapping) to determine a channel-specific transmitter gain associated with transmitting the advertisement.

In this way, the beacon may be configured to generate and/or transmit corresponding advertisements via corresponding channels to indicate the channel of the transmission and/or the channel-specific gain of the transmission.

As further shown in FIG. 1A, and by reference number 120, the beacon generates and transmits the advertisement. For example, the beacon may generate the advertisement via any suitable modulation technique and transmit the advertisement by via an antenna (e.g., a directional or omnidirectional antenna) of the beacon. Accordingly, the advertisement may be broadcast so that the advertisement can be received by the asset or any other device configured to receive (or listen for) advertisements from the beacon. As a more specific example, the advertisement may be transmitted as a BLE communication (e.g., a BLE advertisement) that can be received by a BLE-enabled device.

To generate the advertisement, the beacon may identify or determine which channel (e.g., which of a low channel, middle channel, or high channel) is to be used to transmit the advertisement. For example, the beacon may refer to a schedule for transmitting the advertisements. Based on the schedule identifying a particular channel (e.g., via a channel ID), the beacon may generate the advertisement by including the channel identifier and information identifying the corresponding channel-specific transmitter gain (e.g., which may be obtained or determined by referring to the calibration mapping) within the advertisement. In some implementations, the beacon may select advertisement data for the channel from an advertisement data structure. The advertisement data structure may include prestored advertisement data that includes a channel identifier and corresponding channel-specific transmitter gain. Accordingly, the beacon may identify advertisement data for an advertisement that is to be transmitted via a particular channel based on the channel identifier of the advertisement data, select the advertisement data, and modulate the advertisement data to generate the advertisement.

When the schedule indicates that the advertisement is to be transmitted, the beacon may transmit the generated advertisement, with the channel-specific transmitter gain, via an antenna of the beacon. In this way, as described herein, the beacon may generate and/or transmit corresponding advertisements via corresponding channels to indicate the channel of the transmission and/or the channel-specific gain of the transmission.

As further shown in FIG. 1A, and by reference number 130, the asset receives and processes the advertisement. For example, the asset may receive the advertisement when the asset is within a threshold distance of the beacon. The threshold distance may correspond to a range of a wireless communication technology (e.g., BLUETOOTH®, BLE, and/or the like) used to transmit the advertisement (e.g., based on attenuation properties of the advertisement).

As described herein, the asset may receive the advertisement via a particular channel (e.g., the channel on which the advertisement was transmitted). In some implementations, the asset may receive the advertisement based on scanning one or more channels (e.g., one or more of the plurality of channels on which the beacon may transmit advertisements). Additionally, or alternatively, the asset may receive multiple advertisements from the beacon via corresponding channels.

Based on receiving the advertisement, the asset may process the advertisement to perform locationing processes associated with the beacon and/or the asset. The asset may process the advertisement according to any suitable PDU processing technique. For example, the asset may process the header of the advertisement to identify on which channel the advertisement was received (and/or transmitted). Furthermore, the asset may process the payload to identify (e.g., based on the beacon ID) that the beacon (specifically WP1) transmitted the advertisement and/or that the beacon has a channel-specific transmitter gain. The asset may process the payload to identify the channel-specific transmitter gain based on identifying that the header included a channel identifier. Accordingly, if the asset receives an advertisement that does not include a channel identifier in the header, the asset may determine that the advertisement does not have channel-specific transmitter information, and may perform locationing processes without channel-specific transmitter information.

In this way, the asset may receive and/or process the advertisement for locationing using the channel-specific gain information.

Figure 1B:
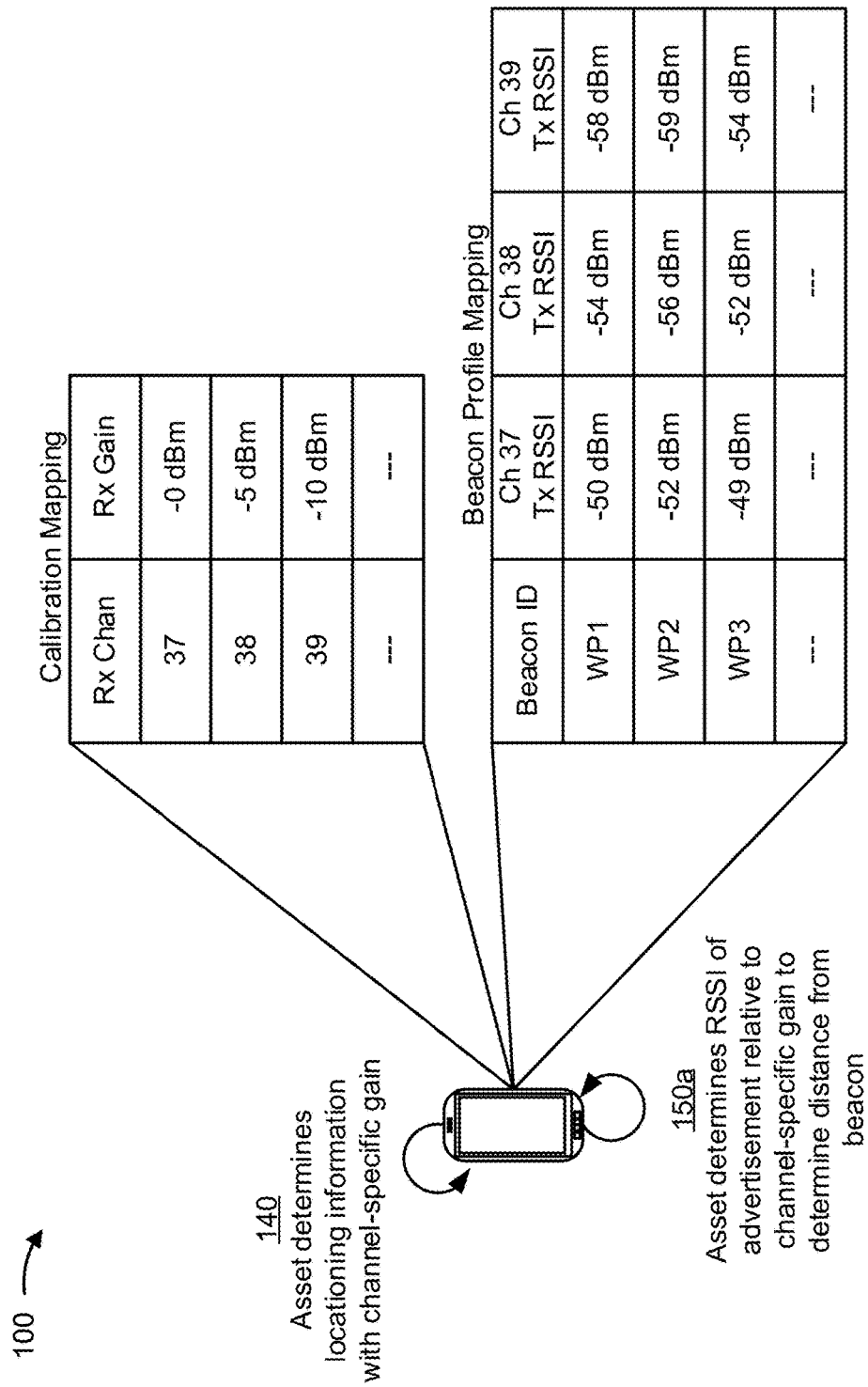

As shown in FIG. 1B, and by reference number 140, the asset determines locationing information associated with channel-specific gain. For example, the asset may determine a channel-specific receiver gain associated with receiving the advertisement. The asset may determine the channel-specific receiver gain based on a calibration mapping in a data structure of the asset. For example, the calibration mapping may map channel identifiers of individual channels to corresponding channel-specific receiver gains of a receiver antenna of the asset. In some implementations, the calibration mapping may include a default value for a receiver gain (e.g., similar to the default value of the calibration mapping of the beacon). Accordingly, the asset may refer to the calibration mapping (e.g., perform a lookup operation to find the channel identifier in the calibration mapping) to determine a channel-specific receiver gain associated with receiving the advertisement.

In some implementations, the asset may determine a channel-specific transmitter gain associated with the beacon transmitting the advertisement. For example, the asset may determine the channel-specific transmitter gain based on processing the advertisement and/or identifying the channel-specific transmitter information in the advertisement. As described herein, the channel-specific transmitter information may specify the transmitter gain of the beacon. In such an example, the transmitter gain may be subtracted from an RSSI measurement of the advertisement to determine the free space path loss of the advertisement (which may correspond to and/or may represent the distance between the beacon and the asset).

Additionally, or alternatively, if the channel-specific transmitter information indicates an RSSI calibration reading at a particular distance from the beacon (e.g., one meter), the asset may calculate the transmitter gain based on the RSSI calibration reading. For example, assuming a free space path loss at one meter (e.g., a constant known to the asset) of 40 dB, if the channel-specific transmitter information of an advertisement indicates an RSSI calibration reading of −50 dB at one meter, then the channel-specific transmitter gain for the advertisement may be determined by combining the RSSI calibration reading with the free space path loss. Accordingly, in such an example, the transmitter gain would be determined to be −10 dB (−50 dB+40 dB). Further, if the RSSI measurement for the advertisement is −65 dB, the free space path loss (without considering a channel-specific receiver gain) may be determined to be −55 dB (−65 dB−−10 dB). In such an example, the asset may then subtract the channel-specific receiver gain of the asset from −55 dB to determine the path loss between the beacon and the asset.

Additionally, or alternatively, the asset may determine the channel-specific transmitter gain using a beacon profile mapping in a data structure of the asset (e.g., if the channel-specific transmitter information is not included within the advertisement). For example, the beacon profile mapping of the asset may map beacon identifiers of beacons to corresponding channel-specific transmitter information of the beacons. Accordingly, the asset may identify the beacon identifier in the payload of the advertisement and perform a lookup operation to identify the beacon identifier in the beacon profile mapping (e.g., to find the beacon identifier "WP1") to determine channel-specific transmitter information (and/or a transmitter gain) of the beacon for the channel identified in the advertisement. The example beacon profile mapping of FIG. 1B identifies channel-specific transmitter RSSI calibration readings at a particular distance from the beacons. In such a case, the beacon profile mapping may be associated with a known or fixed transmit power of the beacons. In some implementations, a plurality of beacon profile mappings may be included for various levels of transmission power (e.g., which correspondingly may be indicated or included by the beacons within the advertisement). Additionally, or alternatively, the beacon profile mapping may include and/or identify a particular transmitter gain associated with the beacons. In such a case, the transmitter gain may account for a free space path loss at the particular distance, as indicated or determined during calibration, which may depend on an environment of the beacons.

Accordingly, the asset may determine a channel-specific gain that includes a channel-specific receiver gain and a channel-specific transmitter gain. The channel-specific gain may be included within locationing information to permit the asset to perform a locationing operation, as described herein. In this way, the asset may determine locationing information that identifies channel-specific transmitter gain of the beacon and/or channel-specific receiver gain of the asset.

As further shown in FIG. 1B, and by reference number 150a, the asset may determine an RSSI measurement of the advertisement relative to the channel-specific gain to determine a distance from the beacon. For example, the asset may determine the RSSI measurement based on a measured RSSI of the advertisement, the channel-specific transmitter gain, and the channel-specific receiver gain. More specifically, the asset may adjust the measured RSSI of the advertisement to account for the channel-specific transmitter gain and the channel-specific receiver gain (e.g., by offsetting the measured RSSI with the channel-specific transmitter gain and/or the channel-specific receiver gain). For example, the asset may combine the channel-specific transmitter gain (e.g., determined from the channel-specific transmitter information) with channel-specific receiver gain to determine channel-specific gain of the advertisement and subtract the combined channel-specific gain from the measured RSSI to identify the channel-specific path loss over the distance from the beacon to the asset, which can be used to more accurately determine the distance between the beacon and the asset. In this way, the RSSI measurement may be more accurate than using only the measured RSSI of the advertisement (the power level of advertisement signal at the time of receipt) and/or than using the measured RSSI of the advertisement without using channel-specific gain information.

The RSSI measurement may then be used to determine a distance between the beacon and the asset using any suitable locationing technique. For example, the asset may utilize a locationing mapping in a data structure of the asset. The locationing mapping may map RSSI measurements to corresponding distance values. Accordingly, the asset may perform a lookup operation (e.g., to find the RSSI measurement) of the locationing mapping to determine a distance between the asset and the beacon based on the locationing mapping. The asset may perform similar operations in association with other beacons to perform a locationing operation (e.g., triangulation) to determine a specific location of the asset based on the distance between the asset and the beacon. For example, the beacon profile mapping may include location information that identifies a location of WP1 and other beacons that transmitted advertisements processed by the asset. The location information may include an address and/or coordinates (e.g., geographical coordinates, location specific coordinates, and/or the like), waypoint information associated with the location (e.g., a building identifier, a room identifier, an aisle identifier, a shelf identifier, and/or the like), and/or the like.

In this way, the asset may determine a distance between the beacon and the asset and/or the asset may determine a location of the asset based on the distance. According to some implementations, the asset may perform one or more operations associated with the distance and/or the location of the asset. For example, the asset may indicate (e.g., on a display of a user interface of the asset) the distance between the beacon and the asset (e.g., so that a user of the asset or a user monitoring the asset can see the distance or see a visual representation of the distance). Additionally, or alternatively, the asset may indicate the location of the asset (e.g., relative to a map or other objects of an area of the location). In some implementations, the beacon may provide the distance and/or the location of the asset to a locationing platform communicatively coupled to the asset.

Figure 1C:
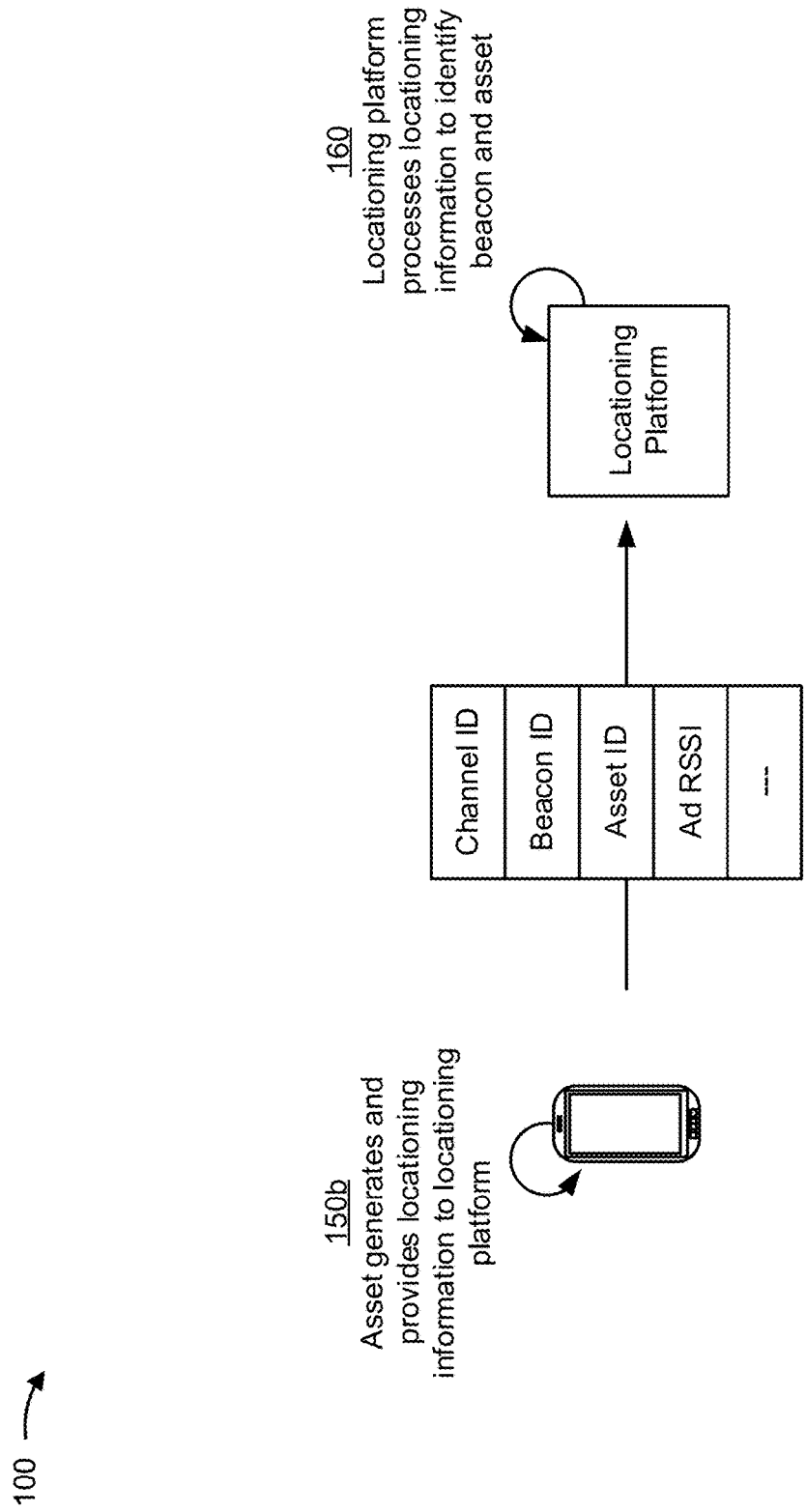

As shown in FIG. 1C, and by reference number 150b, the asset generates and provides locationing information to the locationing platform. The asset may generate and/or provide the locationing information to the locationing platform in addition to, or as an alternative, to determining the RSSI measurement of the advertisement, the distance between the asset and the beacon, and/or the location of the asset, as described above in connection with reference number 150a. As shown, the locationing information may include the channel identifier, a beacon identifier, an asset identifier of the asset, and a measured RSSI of the advertisement. In some implementations, the asset may include channel-specific gain information within the locationing information, that includes information identifying the channel-specific transmitter gain and/or the channel-specific receiver gain.

The asset may generate the locationing information to have a format that permits the locationing platform to determine a location of the asset (e.g., relative to the beacon). For example, the asset may include the locationing information in a file that can be communicated to the locationing platform for locationing. In some implementations, the file may be associated with a data-interchange format (e.g., a JAVASCRIPT® Object Notation (JSON) format). In this way, the asset may generate the locationing information to permit the locationing platform to perform locationing to determine the location of the asset and/or a distance between the asset and the beacon.

As further shown in FIG. 1C, and by reference number 160, the locationing platform processes the locationing information to identify the beacon and the asset. For example, the locationing platform may process a file that includes the locationing information and parse the locationing information to identify the beacon identifier and the asset identifier. In this way, based on identifying the beacon and the asset, the locationing platform may perform locationing to determine the location of the asset.

Figure 1D:
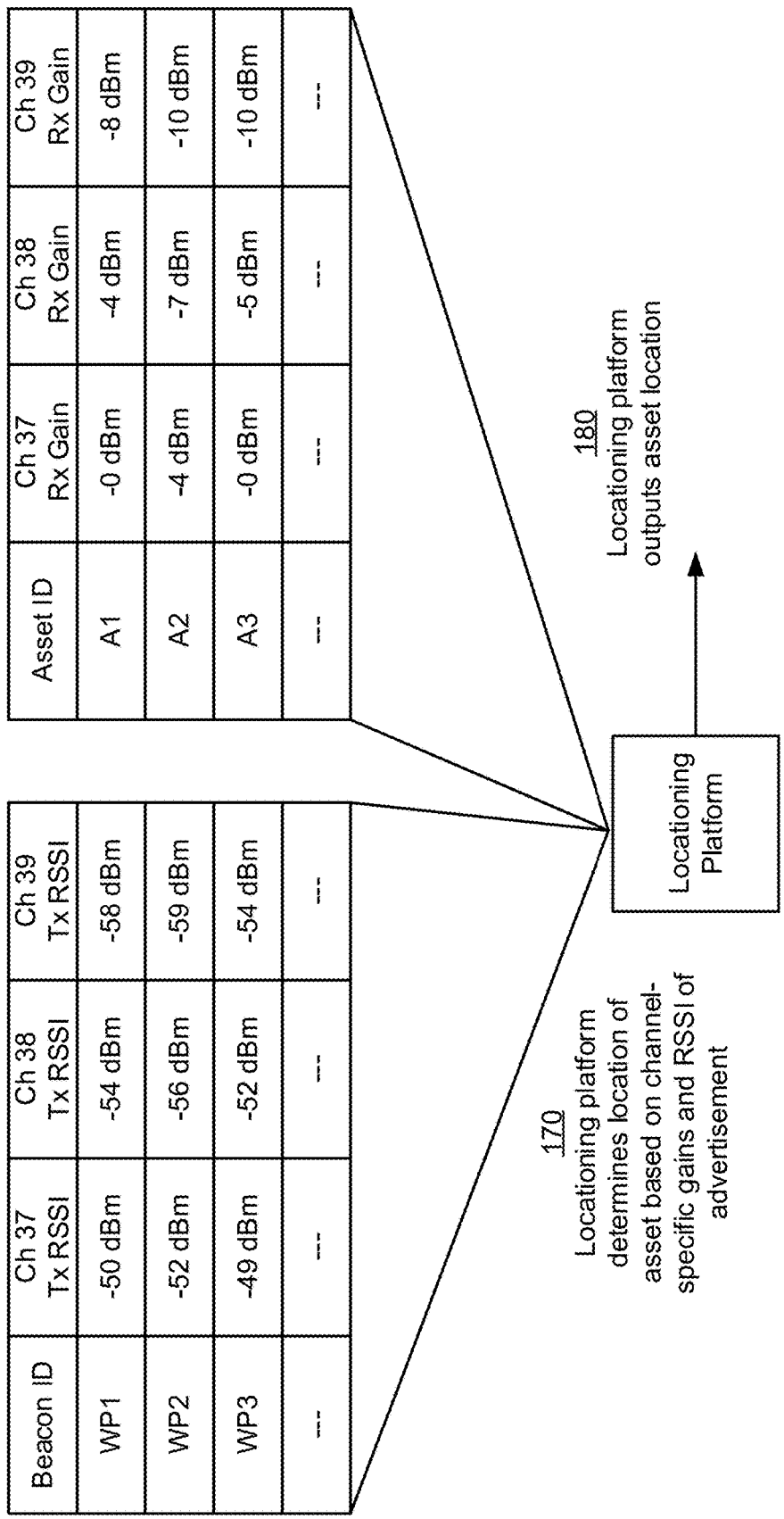

As shown in FIG. 1D, and by reference number 170, the locationing platform determines a location of the asset based on the channel-specific gains and the measured RSSI of the advertisement. For example, as shown, the locationing platform may include calibration mappings for the beacon and/or the asset to permit the locationing platform to lookup the channel-specific transmitter gain of the beacon and the channel-specific receiver gain of the asset. As described herein, the locationing platform may use the measured RSSI, the channel-specific transmitter gain, and the channel-specific receiver gain to determine an RSSI measurement of the advertisement. Using the RSSI measurement, the locationing platform may determine the distance between the beacon and the asset, as described herein, and/or a location of the asset.

In this way, the locationing platform may determine a location of the asset to permit the locationing platform to perform one or more actions based on the determined location.

As further shown in FIG. 1D, and by reference number 180, the locationing platform outputs the asset location. For example, the locationing platform may provide the asset location (e.g., within asset information) to identify the location of the asset (e.g., at the time the advertisement was received by the asset or transmitted by the beacon). Additionally, or alternatively, the locationing platform may cause a display device (e.g., of a user interface of the locationing platform) to present the location of the asset. In some implementations, the location of the asset may be presented on a map (e.g., to permit a user or operator to identify the location of the asset).

According to some implementations, the locationing platform may store information identifying the location of the asset in a data structure of the locationing platform. For example, the data structure may be configured to store information to track a location of the asset and/or other assets. Moreover, based on the tracked location of the asset, the locationing platform may enable and/or cause one or more other devices to utilize the locationing information for one or more operations involving the asset. For example, the asset may be a scanner device (or is associated with a scanner device), and the locationing platform may track a location of items (e.g., products, inventory, machinery, and/or the like) scanned by the scanner device based on the location of the scanner device. As another example, the asset may be an autonomous vehicle, and the locationing platform may provide the location of the autonomous vehicle to a dispatch center and/or autonomous vehicle control center to enable control, navigation, or operations of the autonomous vehicle. In some instances, the asset may be associated with a product or machine of an assembly line, and the locationing platform may be configure to provide the location of the product or machine to enable tracking the product or machine through the assembly line. In this way, in various types of applications or industries, the locationing platform may perform one or more actions based on determining the location of the asset using channel-specific gain information.

Accordingly, as described herein, the beacon, the asset, and/or the locationing platform may utilize a channel-specific gain of the beacon and/or the asset to determine a distance between the beacon and the asset. Using a channel-specific gain adjustment for an RSSI measurement, rather than a gain adjustment of the beacon or asset that is not based on the channel used to transmit or receive the advertisement, the asset and/or the locationing platform may more accurately determine a distance between the beacon and the asset and/or a location of the asset relative to the beacon (e.g., because differences in gain across the channels is addressed by the channel-specific gain adjustment). The ability to more accurately determine the location of the asset may enhances various uses and/or applications that utilize locationing.

As indicated above, FIGS. 1A-1D are provided merely as one or more examples. Other examples may differ from what is described with regard to FIGS. 1A-1D.

Figure 2:
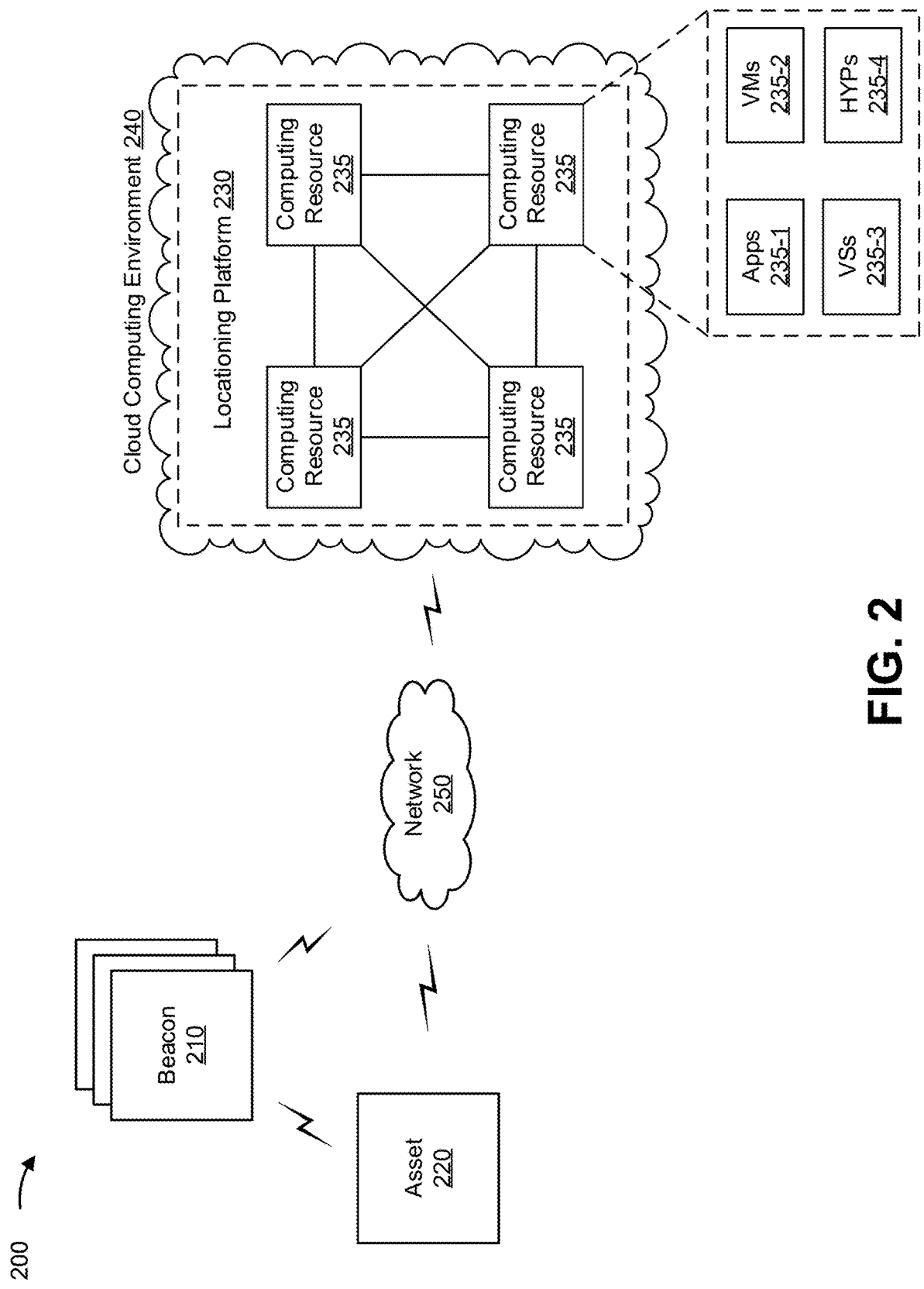
FIG. 2 is a diagram of an example environment in which systems and/or methods described herein may be implemented.

FIG. 2 is a diagram of an example environment 200 in which systems and/or methods described herein may be implemented. As shown in FIG. 2, the environment 200 may include one or more beacons 210 (referred to herein individually as "beacon 210", and collectively as "beacons 210"), an asset 220, a locationing platform 230, one or more computing resources 235 (referred to herein individually as "computing resource 235", and collectively as "computing resources 235") of a cloud computing environment 240, and a network 250. Devices of the environment 200 may interconnect via wired connections, wireless connections, or a combination of wired and wireless connections.

The beacon 210 includes one or more devices or components capable of generating, storing, processing, and/or providing locationing information associated with performing locationing of the asset 220 relative to the beacon 210. For example, the beacon 210 may be configured to include, within advertisements transmitted from the beacon 210, information identifying a channel for transmitting the advertisement and/or channel-specific transmitter gain specific to the beacon 210 (e.g., a calibration transmitter gain). One or more of the beacons 210 may correspond to the beacon of example implementation 100.

The asset 220 includes one or more devices capable of receiving, generating, storing, processing, and/or providing information associated with performing locationing of the asset 220. For example, the asset 220 may include a mobile communication device and/or mobile computing device, such as a mobile phone (e.g., a smartphone, a radiotelephone, etc.), a laptop computer, a tablet computer, a handheld computer, a scanner device (e.g., a barcode scanner), a wearable communication device (e.g., a smart wristwatch, a pair of smart eyeglasses, etc.), a tracking device, a locator beacon, a diagnostic device, an industry specific computing device, a vehicle (e.g., including an operator controlled vehicle, an autonomous vehicle, or semiautonomous vehicle), or a similar type of device. The asset 220, as described herein, may correspond to the asset of example implementation 100 and/or may be designated as being associated with an object of interest (e.g., an object that is to be monitored by locationing platform 230).

The locationing platform 230 includes one or more computing resources assigned to perform locationing associated with the beacon 210 and/or the asset 220. For example, the locationing platform 230 may be a platform implemented by the cloud computing environment 240 that may process locationing information from the asset, determine a location of the asset based on the locationing information identifying the beacon, channel-specific gain information, and an RSSI of an advertisement, and/or perform one or more actions associated with the location.

The locationing platform 230 may include a server device or a group of server devices. In some implementations, the locationing platform 230 may be hosted in cloud computing environment 240. For example, the locationing platform 230 is implemented by the computing resources 235 of the cloud computing environment 240. Notably, while implementations described herein may describe the locationing platform 230 as being hosted in the cloud computing environment 240, in some implementations, the locationing platform 230 may be non-cloud-based or may be partially cloud-based.

The cloud computing environment 240 includes an environment that delivers computing as a service, whereby shared resources, services, and/or the like may be provided to the beacon 210, the asset 220, and/or the like. The cloud computing environment 240 may provide computation, software, data access, storage, and/or other services that do not require end-user knowledge of a physical location and/or configuration of a system and/or a device that delivers the services. As shown, the cloud computing environment 240 may include the locationing platform 230 and the computing resource 235.

The computing resource 235 includes one or more personal computers, workstation computers, server devices, or another type of computation and/or communication device. In some implementations, the computing resource 235 may host the locationing platform 230. The cloud resources may include compute instances executing in the computing resource 235, storage devices provided in the computing resource 235, data transfer devices provided by the computing resource 235, and/or the like. In some implementations, the computing resource 235 may communicate with other computing resources 235 via wired connections, wireless connections, or a combination of wired and wireless connections.

As further shown in FIG. 2, the computing resource 235 may include a group of cloud resources, such as one or more applications ("APPs") 235-1, one or more virtual machines ("VMs") 235-2, virtualized storage ("VSs") 235-3, one or more hypervisors ("HYPs") 235-4, or the like.

The application 235-1 includes one or more software applications that may be provided to or accessed by asset 220. The application 235-1 may eliminate a need to install and execute the software applications on the beacon 210 or the asset 220. For example, the application 235-1 may include software associated with the locationing platform 230 and/or any other software capable of being provided via the cloud computing environment 240. In some implementations, one application 235-1 may send/receive information to/from one or more other applications 235-1, via the virtual machine 235-2.

The virtual machine 235-2 includes a software implementation of a machine (e.g., a computer) that executes programs like a physical machine. The virtual machine 235-2 may be either a system virtual machine or a process virtual machine, depending upon use and degree of correspondence to any real machine by the virtual machine 235-2. A system virtual machine may provide a complete system platform that supports execution of a complete operating system ("OS"). A process virtual machine may execute a single program and may support a single process. In some implementations, the virtual machine 235-2 may execute on behalf of a user (e.g., the asset 220), and may manage infrastructure of the cloud computing environment 240, such as data management, synchronization, or long-duration data transfers.

The virtualized storage 235-3 includes one or more storage systems and/or one or more devices that use virtualization techniques within the storage systems or devices of the computing resource 235. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations. According to some implementations, the virtualized storage 235-3 may include or be associated with a distributed ledger, a blockchain, and/or the like.

The hypervisor 235-4 provides hardware virtualization techniques that allow multiple operating systems (e.g., "guest operating systems") to execute concurrently on a host computer, such as the computing resource 235. The hypervisor 235-4 may present a virtual operating platform to the "guest operating systems" and may manage the execution of the guest operating systems. Multiple instances of a variety of operating systems may share virtualized hardware resources.

The network 250 includes one or more wired and/or wireless networks. For example, the network 250 may include a local area network (LAN), a wide area network (WAN), a metropolitan area network (MAN), a cellular network (e.g., a long-term evolution (LTE) network, a code division multiple access (CDMA) network, a 3G network, a 4G network, a 5G network, another type of next generation network, and/or the like), a public land mobile network (PLMN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
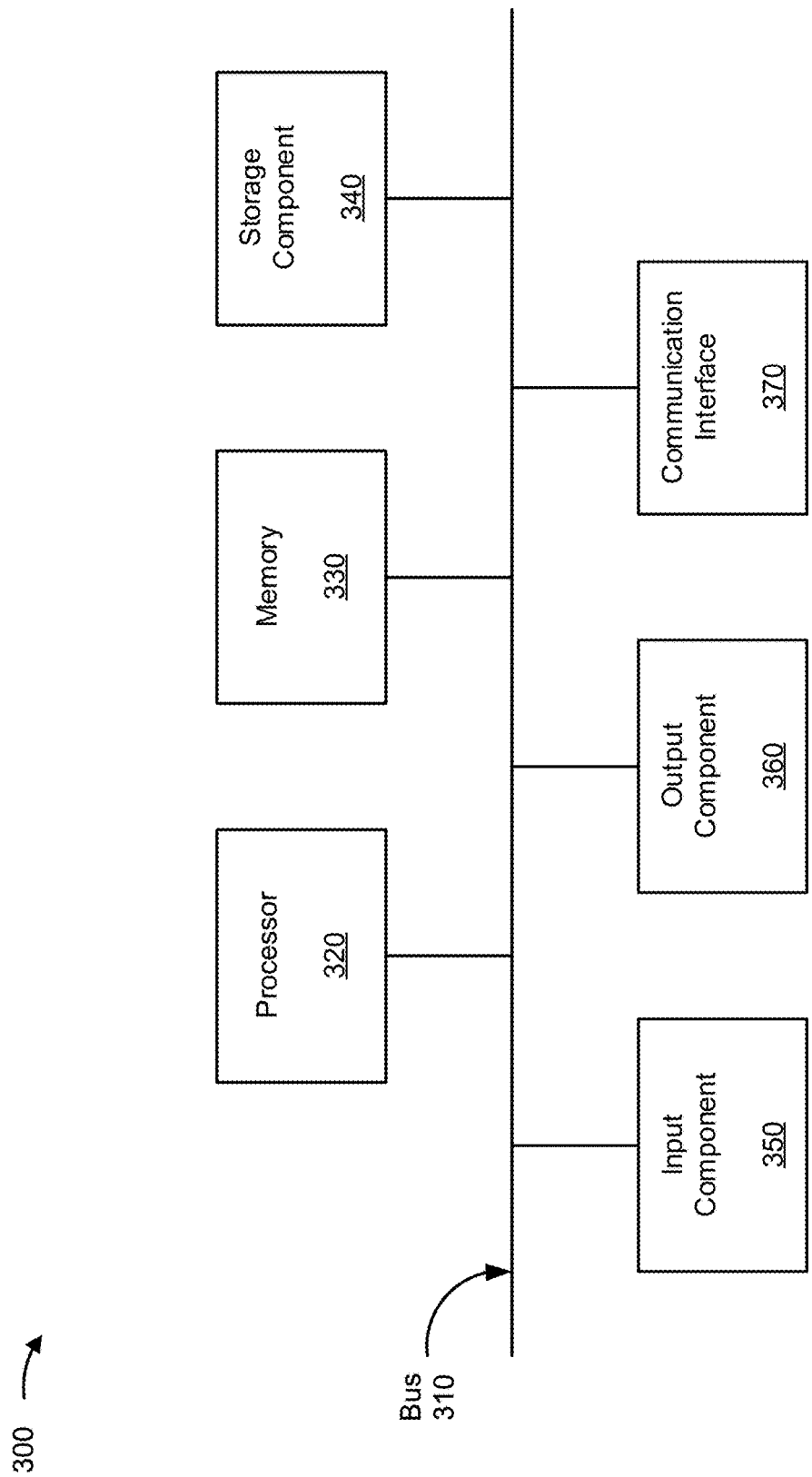
FIG. 3 is a diagram of example components of one or more devices of FIG. 2.

FIG. 3 is a diagram of example components of a device 300. The device 300 may correspond to the beacon 210, the asset 220, the locationing platform 230, and/or one or more of the computing resources 235. In some implementations, the beacon 210, the asset 220, the locationing platform 230, and/or one or more of the computing resources 235 may include one or more devices 300 and/or one or more components of the device 300. As shown in FIG. 3, the device 300 may include a bus 310, a processor 320, a memory 330, a storage component 340, an input component 350, an output component 360, and a communication interface 370.

The bus 310 includes a component that permits communication among multiple components of the device 300. The processor 320 is implemented in hardware, firmware, and/or a combination of hardware and software. The processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 320 includes one or more processors capable of being programmed to perform a function. The memory 330 includes a random access memory (RAM), a read only memory (ROM), and/or another type of dynamic or static storage device (e.g., a flash memory, a magnetic memory, and/or an optical memory) that stores information and/or instructions for use by the processor 320.

The storage component 340 stores information and/or software related to the operation and use of the device 300. For example, the storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

The input component 350 includes a component that permits the device 300 to receive information, such as via user input (e.g., a touch screen display, a keyboard, a keypad, a mouse, a button, a switch, and/or a microphone). Additionally, or alternatively, the input component 350 may include a component for determining location (e.g., a global positioning system (GPS) component) and/or a sensor (e.g., an accelerometer, a gyroscope, an actuator, another type of positional or environmental sensor, and/or the like). The output component 360 includes a component that provides output information from the device 300 (via, e.g., a display, a speaker, a haptic feedback component, an audio or visual indicator, and/or the like).

The communication interface 370 includes a transceiver-like component (e.g., a transceiver, a separate receiver, a separate transmitter, and/or the like) that enables the device 300 to communicate with other devices, such as via a wired connection, a wireless connection, or a combination of wired and wireless connections. The communication interface 370 may permit the device 300 to receive information from another device and/or provide information to another device. For example, the communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

The device 300 may perform one or more processes described herein. The device 300 may perform these processes based on the processor 320 executing software instructions stored by a non-transitory computer-readable medium, such as the memory 330 and/or the storage component 340. As used herein, the term "computer-readable medium" refers to a non-transitory memory device. A memory device includes memory space within a single physical storage device or memory space spread across multiple physical storage devices.

Software instructions may be read into the memory 330 and/or the storage component 340 from another computer-readable medium or from another device via the communication interface 370. When executed, software instructions stored in the memory 330 and/or the storage component 340 may cause the processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, the device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
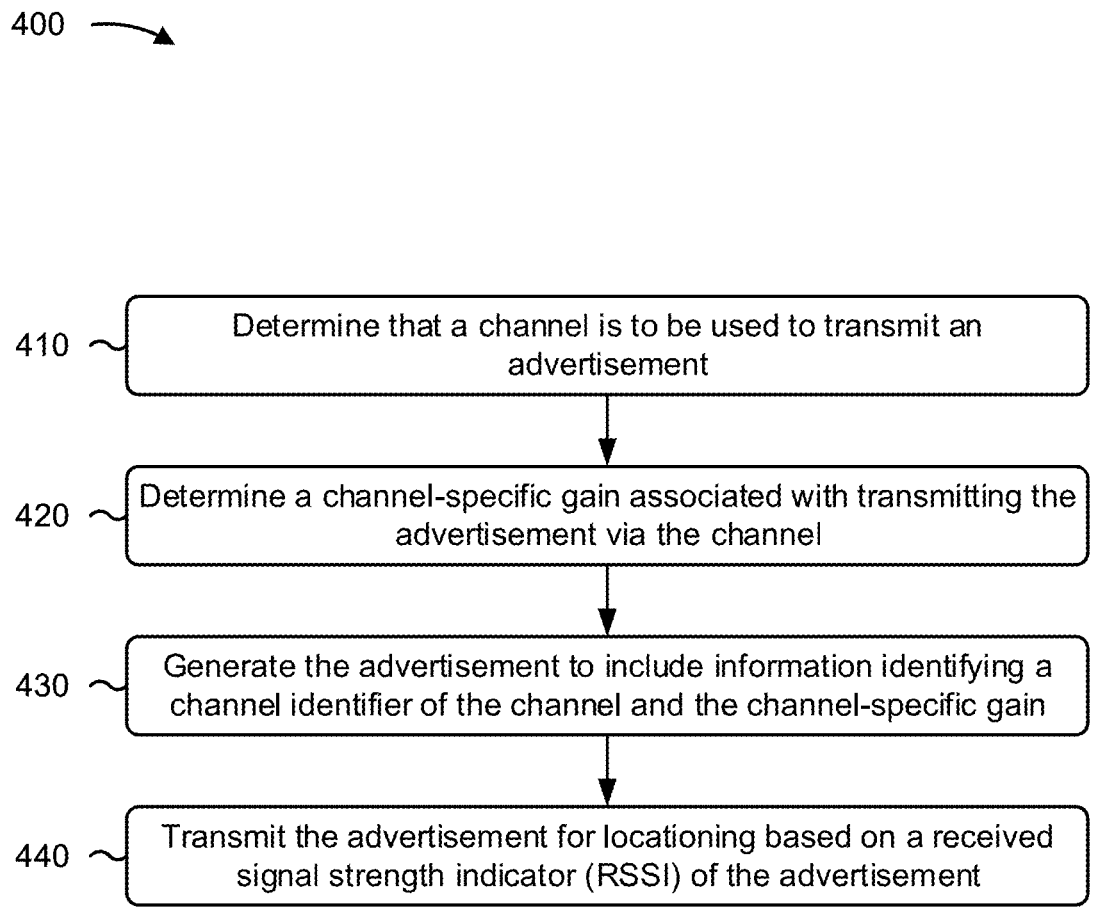
FIGS. 4-6 are flowcharts of example processes for locationing based on channel-specific gain.

FIG. 4 is a flowchart of an example process 400 for locationing based on channel-specific gain. In some implementations, one or more process blocks of FIG. 4 may be performed by a beacon (e.g., the beacon 210). In some implementations, one or more process blocks of FIG. 4 may be performed by another device or a group of devices separate from or including the beacon, such as a wireless communication device (e.g., the asset 220), a locationing platform (e.g., the locationing platform 230), and/or the like.

As shown in FIG. 4, the process 400 may include determining that a channel is to be used to transmit an advertisement (block 410). For example, the beacon (e.g., using the processor 320, the memory 330, the storage component 340, the input component 350, the output component 360, the communication interface 370 and/or the like) may determine that a channel is to be used to transmit an advertisement, as described above.

In some implementations, the channel is determined according to a schedule of transmitting individual advertisements via one of a plurality of channels.

As further shown in FIG. 4, the process 400 may include determining a channel-specific gain associated with transmitting the advertisement via the channel (block 420). For example, the beacon (e.g., using the processor 320, the memory 330, the storage component 340, the input component 350, the output component 360, the communication interface 370 and/or the like) may determine a channel-specific gain associated with transmitting the advertisement via the channel, as described above.

In some implementations, the channel-specific gain is determined from a calibration mapping that indicates the channel-specific gain for the channel, and the calibration mapping includes respective gain information for each channel of a plurality of channels that may be used to transmit the advertisement. The channel-specific gain may be associated with an RSSI reading determined during a transmitter calibration of the device.

As further shown in FIG. 4, the process 400 may include generating the advertisement to include information identifying a channel identifier of the channel and the channel-specific gain (block 430). For example, the beacon (e.g., using the processor 320, the memory 330, the storage component 340, the input component 350, the output component 360, the communication interface 370 and/or the like) may generate the advertisement to include information identifying a channel identifier of the channel and the channel-specific gain, as described above.

In some implementations, the beacon, when generating the advertisement to include the information, may include the channel identifier in a header of the advertisement and include a value of the channel-specific gain in a payload of the advertisement. The advertisement may include an identifier of the beacon, to permit a locationing platform to determine a location of a wireless communication device based on a location of the device.

As further shown in FIG. 4, the process 400 may include transmitting the advertisement for locationing based on a RSSI of the advertisement (block 440). For example, the beacon (e.g., using the processor 320, the memory 330, the storage component 340, the input component 350, the output component 360, the communication interface 370 and/or the like) may transmit the advertisement for locationing based on a RSSI of the advertisement, as described above. The advertisement may be transmitted as a BLE communication.

In some implementations, the process 400 includes storing, in association with a transmitter calibration of the device and in a calibration mapping, the channel-specific gain in association with the channel identifier.

Although FIG. 4 shows example blocks of the process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
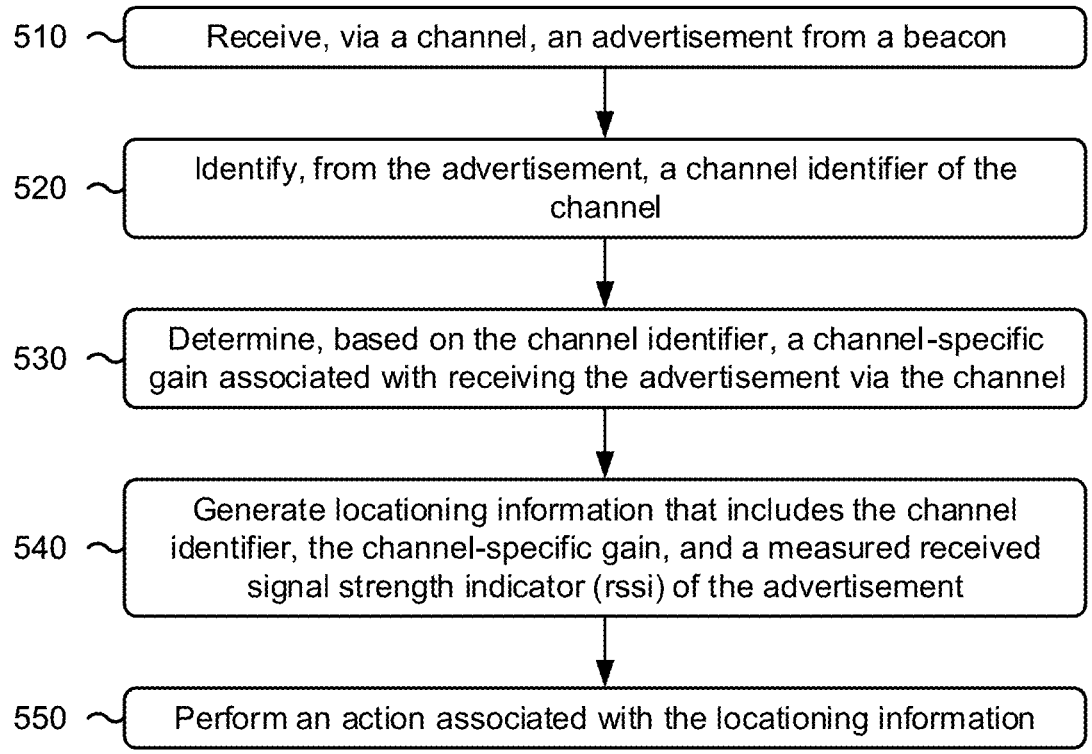

FIG. 5 is a flowchart of an example process 500 for locationing based on channel-specific gain. In some implementations, one or more process blocks of FIG. 5 may be performed by a wireless communication device (e.g., the asset 220). In some implementations, one or more process blocks of FIG. 5 may be performed by another device or a group of devices separate from or including the wireless communication device, such as a beacon (e.g., the beacon 210), a locationing platform (e.g., the locationing platform 230), and/or the like.

As shown in FIG. 5, the process 500 may include receiving, via a channel, an advertisement from a beacon (block 510). For example, the wireless communication device (e.g., using the processor 320, the memory 330, the storage component 340, the input component 350, the output component 360, the communication interface 370 and/or the like) may receive, via a channel, an advertisement from a beacon, as described above.

As further shown in FIG. 5, the process 500 may include identifying, from the advertisement, a channel identifier of the channel (block 520). For example, the wireless communication device (e.g., using the processor 320, the memory 330, the storage component 340, the input component 350, the output component 360, the communication interface 370 and/or the like) may identify, from the advertisement, a channel identifier of the channel, as described above.

As further shown in FIG. 5, the process 500 may include determining, based on the channel identifier, a channel-specific gain associated with receiving the advertisement via the channel (block 530). For example, the wireless communication device (e.g., using the processor 320, the memory 330, the storage component 340, the input component 350, the output component 360, the communication interface 370 and/or the like) may determine, based on the channel identifier, a channel-specific gain associated with receiving the advertisement via the channel, as described above.

In some implementations, the wireless communication device, when determining the channel-specific gain, may determine a channel-specific transmitter gain associated with the beacon transmitting the advertisement and determine a channel-specific receiver gain associated with the wireless communication device receiving advertisements via the channel. The channel-specific gain may be determined to include the channel-specific transmitter gain and the channel-specific receiver gain. The channel-specific transmitter gain may be determined based on the channel-specific transmitter gain being indicated in the advertisement.

In some implementations, the wireless communication device, when determining the channel-specific transmitter gain, may determine, from the advertisement, a beacon identifier of the beacon and determine, based on the beacon identifier and the channel identifier, the channel-specific transmitter gain using a beacon profile mapping. The beacon profile mapping may include respective channel-specific transmitter gain information for the beacon and one or more other beacons.

As further shown in FIG. 5, the process 500 may include generating locationing information that includes the channel identifier, the channel-specific gain, and a measured RSSI of the advertisement (block 540). For example, the wireless communication device (e.g., using the processor 320, the memory 330, the storage component 340, the input component 350, the output component 360, the communication interface 370 and/or the like) may generate locationing information that includes the channel identifier, the channel-specific gain, and a measured RSSI of the advertisement, as described above. In some implementations, the wireless communication device, when generating the locationing information may include a beacon identifier of the beacon in the locationing information.

As further shown in FIG. 5, the process 500 may include performing an action associated with the locationing information (block 550). For example, the wireless communication device (e.g., using the processor 320, the memory 330, the storage component 340, the input component 350, the output component 360, the communication interface 370 and/or the like) may perform an action associated with the locationing information, as described above.

In some implementations, the wireless communication device, when performing the action, may provide the locationing information to a locationing platform to indicate a location of the wireless communication device based on the beacon identifier, the channel identifier, the channel-specific gain, and the RSSI.

In some implementations, the wireless communication device, when performing the action, may identify, from the advertisement, a beacon identifier of the beacon; determine, based on the beacon identifier and a location mapping, a location of the beacon; determine a distance between a location of the wireless communication device and the location of the beacon, wherein the distance is determined based on offsetting the channel-specific gain from the RSSI; and indicate, based on the distance, the location of the wireless communication device to a display of the wireless communication device or a locationing platform communicatively coupled to the wireless communication device.

Although FIG. 5 shows example blocks of the process 500, in some implementations, the process 500 may include additional blocks, fewer blocks, different blocks, or differently arranged blocks than those depicted in FIG. 5. Additionally, or alternatively, two or more of the blocks of the process 500 may be performed in parallel.

Figure 6:
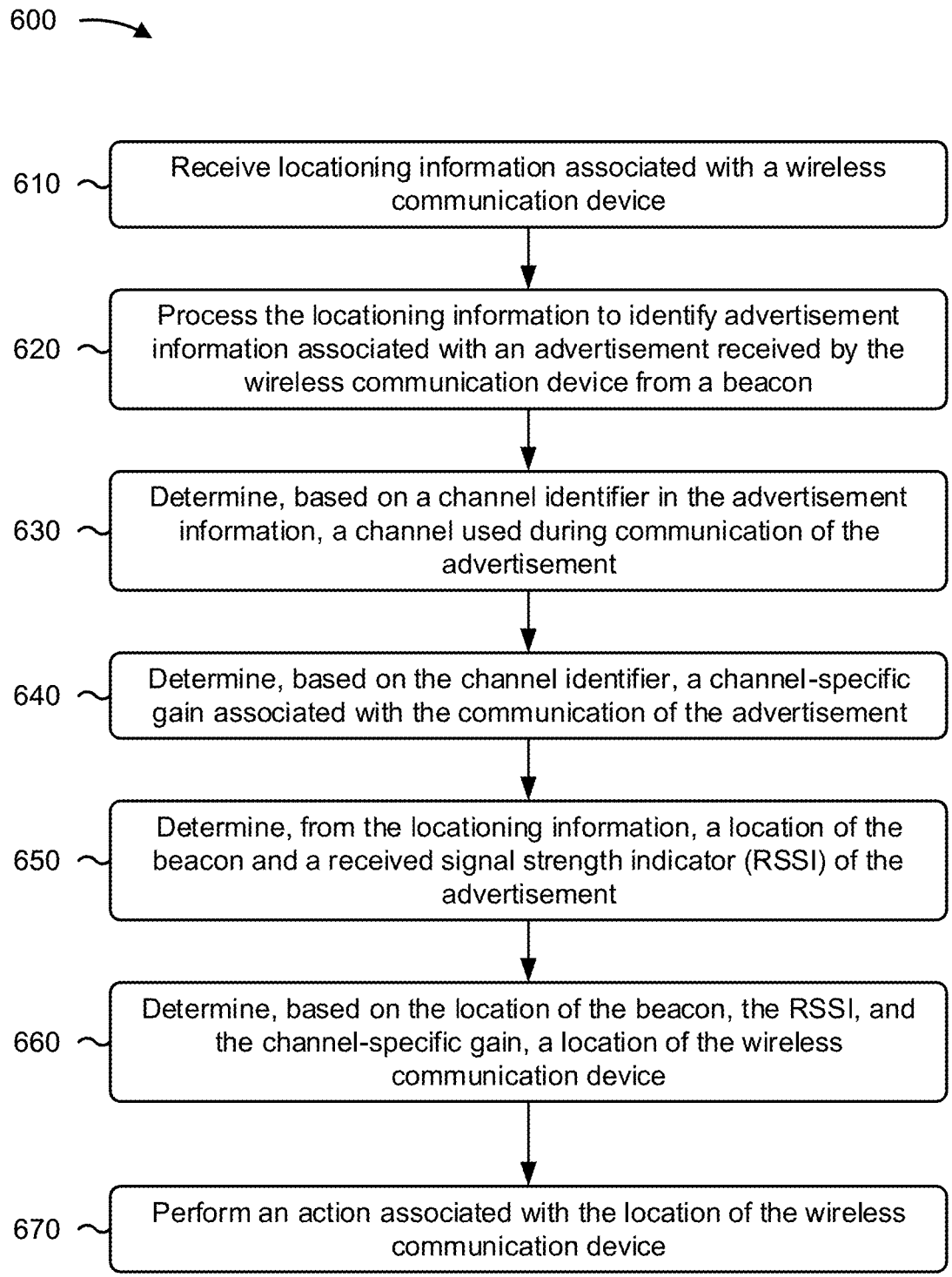

FIG. 6 is a flowchart of an example process 600 for locationing based on channel-specific gain. In some implementations, one or more process blocks of FIG. 6 may be performed by a locationing platform (e.g., the locationing platform 230). In some implementations, one or more process blocks of FIG. 6 may be performed by another device or a group of devices separate from or including the locationing platform, such as a beacon (e.g., the beacon 210), a wireless communication device (e.g., the asset 220), and/or the like.

As shown in FIG. 6, the process 600 may include receiving locationing information associated with a wireless communication device (block 610). For example, the locationing platform (e.g., using the processor 320, the memory 330, the storage component 340, the input component 350, the output component 360, the communication interface 370 and/or the like) may receive locationing information associated with a wireless communication device, as described above.

As further shown in FIG. 6, the process 600 may include processing the locationing information to identify advertisement information associated with an advertisement received by the wireless communication device from a beacon (block 620). For example, the locationing platform (e.g., using the processor 320, the memory 330, the storage component 340, the input component 350, the output component 360, the communication interface 370 and/or the like) may process the locationing information to identify advertisement information associated with an advertisement received by the wireless communication device from a beacon, as described above.

As further shown in FIG. 6, the process 600 may include determining, based on a channel identifier in the advertisement information, a channel used during communication of the advertisement (block 630). For example, the locationing platform (e.g., using the processor 320, the memory 330, the storage component 340, the input component 350, the output component 360, the communication interface 370 and/or the like) may determine, based on a channel identifier in the advertisement information, a channel used during communication of the advertisement, as described above.

As further shown in FIG. 6, the process 600 may include determining, based on the channel identifier, a channel-specific gain associated with the communication of the advertisement (block 640). For example, the locationing platform (e.g., using the processor 320, the memory 330, the storage component 340, the input component 350, the output component 360, the communication interface 370 and/or the like) may determine, based on the channel identifier, a channel-specific gain associated with the communication of the advertisement, as described above.

In some implementations, the locationing platform may determine, from the locationing information, a wireless communication device identifier of the wireless communication device and a beacon identifier of the beacon; determine, based on the wireless communication device identifier and a receiver gain mapping, a channel-specific receiver gain associated with the wireless communication device; and determine, based on the beacon identifier and a transmitter gain mapping, a channel-specific transmitter gain associated with the beacon. The channel-specific gain is determined based on the channel-specific receiver gain and the channel-specific transmitter gain.

As further shown in FIG. 6, the process 600 may include determining, from the locationing information, a location of the beacon and a RSSI of the advertisement (block 650). For example, the locationing platform (e.g., using the processor 320, the memory 330, the storage component 340, the input component 350, the output component 360, the communication interface 370 and/or the like) may determine, from the locationing information, a location of the beacon and a RSSI of the advertisement, as described above.

In some implementations, the locationing platform may determine a distance between the beacon and the wireless communication device based on the RSSI and the channel-specific gain; and determine that the location of the wireless communication device is within the distance of the location of the beacon.

As further shown in FIG. 6, the process 600 may include determining, based on the location of the beacon, the RSSI, and the channel-specific gain, a location of the wireless communication device (block 660). For example, the locationing platform (e.g., using the processor 320, the memory 330, the storage component 340, the input component 350, the output component 360, the communication interface 370 and/or the like) may determine, based on the location of the beacon, the RSSI, and the channel-specific gain, a location of the wireless communication device, as described above.

As further shown in FIG. 6, the process 600 may include performing an action associated with the location of the wireless communication device (block 670). For example, the locationing platform (e.g., using the processor 320, the memory 330, the storage component 340, the input component 350, the output component 360, the communication interface 370 and/or the like) may perform an action associated with the location of the wireless communication device, as described above.

In some implementations, the locationing platform may store asset information identifying the location of the wireless communication device in association with a time of the advertisement. Additionally, or alternatively, the locationing platform may provide asset information identifying the location of the wireless communication device in association with the time of the advertisement. In some implementations, the locationing platform may cause a display device to present the location of the wireless communication device.

Although FIG. 6 shows example blocks of the process 600, in some implementations, the process 600 may include additional blocks, fewer blocks, different blocks, or differently arranged blocks than those depicted in FIG. 6. Additionally, or alternatively, two or more of the blocks of the process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, and/or the like) on which machine-readable instructions (e.g., program code in the form of, for example, software and/or firmware) can be stored. Further, as used herein, each of the terms "tangible machine-readable medium," "non-transitory machine-readable medium" and "machine-readable storage device" is expressly defined to exclude propagating signals. That is, as used in any claim of this patent, a "tangible machine-readable medium" cannot be read to be implemented by a propagating signal. Further, as used in any claim of this patent, a "non-transitory machine-readable medium" cannot be read to be implemented by a propagating signal. Further, as used in any claim of this patent, a "machine-readable storage device" cannot be read to be implemented by a propagating signal.

As used herein, each of the terms "tangible machine-readable medium," "non-transitory machine-readable medium" and "machine-readable storage device" is expressly defined as a storage medium on which machine-readable instructions are stored for any suitable duration of time (e.g., permanently, for an extended period of time (e.g., while a program associated with the machine-readable instructions is executing), and/or a short period of time (e.g., while the machine-readable instructions are cached and/or during a buffering process)).

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   determining, by a device, that a channel is to be used to transmit an advertisement;
   determining, by the device, a channel-specific gain associated with with the transmitting advertisement via the channel;
   generating, by the device, the advertisement to include information identifying a channel identifier of the channel and the channel-specific gain;

transmitting, by the device, the advertisement channel for locationing based on a received signal strength indicator (RSSI) of the advertisement channel; and storing, in association with a transmitter calibration of the device and in a calibration mapping, the channel-specific gain in association with the channel identifier.

2. The method of claim 1, wherein the channel is determined according to a schedule of transmitting individual advertisements via one of a plurality of channels within the determined channel.

3. The method of claim 1, wherein the channel-specific gain is determined from the calibration mapping that indicates the channel-specific gain for the channel, wherein the calibration mapping includes respective gain information for each channel of a plurality of channels that may be used to transmit the advertisement.

4. The method of claim 1, wherein the channel-specific gain is associated with the RSSI reading determined during the transmitter calibration of the device.

5. The method of claim 1, wherein generating the advertisement to include the information comprises:

including the channel identifier in a header of the advertisement channel; and including a value of the channel-specific gain in a payload of the advertisement channel.

6. The method of claim 1, wherein the advertisement channel is to include an identifier of the device, to permit a locationing platform to determine a location of a wireless communication device based on a location of the device.

7. The method of claim 1, wherein the advertisement channel is transmitted as a BLUETOOTH® low energy communication channel.

8. A wireless communication device, comprising:
one or more memories; and
one or more processors communicatively coupled to the one or more memories,
configured to:
receive, via a channel, an advertisement from a beacon;
identify, from the advertisement, a channel identifier of the channel and a beacon identifier of the beacon;
determine, based on the beacon identifier and a location mapping, a location of the beacon;
determine, based on the channel identifier, a channel-specific gain associated with receiving the advertisement via the channel;
generate locationing information that includes the channel identifier, the channel-specific gain, and a measured received signal strength indicator (RSSI) of the advertisement channel;
determine a distance between a location of the wireless communication device and the location of the beacon,
wherein the distance is determined based on offsetting the channel-specific gain from the RSSI;
indicate, based on the distance, the location of the wireless communication device to a display of the wireless communication device or a locationing platform communicatively coupled to the wireless communication device; and
perform an action associated with the locationing information.

9. The wireless communication device of claim 8, wherein the one or more processors, when determining the channel-specific gain, are configured to:
determine a channel-specific transmitter gain associated with the beacon transmitting the advertisement channel; and determine a channel-specific receiver gain associated with the wireless communication device receiving the advertisements via the channel,
wherein the channel-specific gain is determined to include the channel-specific transmitter gain and the channel-specific receiver gain.

10. The wireless communication device of claim 9, wherein the channel-specific transmitter gain is determined based on the channel-specific transmitter gain being indicated in the advertisement channel.

11. The wireless communication device of claim 9, wherein the one or more processors, when determining the channel-specific transmitter gain, are configured to:
determine, from the advertisement channel, the beacon identifier of the beacon; and
determine, based on the beacon identifier and the channel identifier, the channel-specific transmitter gain using a beacon profile mapping,
wherein the beacon profile mapping includes a respective channel-specific transmitter gain information for the beacon and one or more other beacons.

12. The wireless communication device of claim 8, wherein the one or more processors, when generating the locationing information, are configured to include the beacon identifier of the beacon in the locationing information, and wherein the one or more processors, when performing the action, are to provide the locationing information to the locationing platform to indicate a location of the wireless communication device based on the beacon identifier, the channel identifier, the channel-specific gain, and the RSSI.

13. The wireless communication device of claim 8, wherein the advertisement channel is a BLUETOOTH® low energy communication channel.

14. A tangible machine-readable medium storing instructions, the instructions comprising:
one or more instructions that, when executed by one or more processors, cause the one or more processors to:
receive locationing information associated with a wireless communication device;
process the locationing information to identify advertisement information associated with an advertisement channel received by the wireless communication device from a beacon;
determine, based on a channel identifier in the advertisement information, a channel used during communication of the advertisement;
determine, based on the channel identifier, a channel-specific gain associated with the communication of the advertisement channel;
determine, from the locationing information, a location of the beacon and a received signal strength indicator (RSSI) of the advertisement channel;
determine, based on the location of the beacon, the RSSI, and the channel-specific gain, a location of the wireless communication device; and
perform an action associated with the location of the wireless communication device.

15. The tangible machine-readable medium of claim 14, wherein the one or more instructions that, when executed, cause the one or more processors to:
determine, from the locationing information, a wireless communication device identifier of the wireless communication device and a beacon identifier of the beacon;

determine, based on the wireless communication device identifier and a receiver gain mapping, a channel-specific receiver gain associated with the wireless communication device; and determine, based on the beacon identifier and a transmitter gain mapping, a channel-specific transmitter gain associated with the beacon, wherein the channel-specific gain is determined based on the channel-specific receiver gain and the channel-specific transmitter gain.

16. The tangible machine-readable medium of claim 14, wherein the one or more instructions that, when executed, cause the one or more processors to:

determine a distance between the beacon and the wireless communication device based on the RSSI and the channel-specific gain; and determine that the location of the wireless communication device is within the distance of the location of the beacon.

17. The tangible machine-readable medium of claim 14, wherein the one or more instructions that, when executed, cause the one or more processors to perform the action, cause the one or more processors to perform at least one of:

store asset information identifying the location of the wireless communication device in association with a time of the advertisement, provide the asset information identifying the location of the wireless communication device in association with the time of the advertisement, or cause a display device to present the location of the wireless communication device.

18. The tangible machine-readable medium of claim 14, wherein the advertisement is communicated as a BLUETOOTH® low energy communication channel.

19. A method, comprising:

determining, by a device, that a channel is to be used to transmit an advertisement;

determining, by the device, a channel-specific gain associated with transmitting the advertisement via the channel, wherein the channel-specific gain is determined from a calibration mapping that indicates the channel-specific gain for the channel; and generating, by the device, the advertisement to include information identifying a channel identifier of the channel and the channel-specific gain;

transmitting, by the device, the advertisement for locationing based on a received signal strength indicator (RSSI) of the advertisement channel, wherein the calibration mapping includes respective gain information for each channel of a plurality of channels that are to be used to transmit the advertisement channel.

20. A method, comprising:

determining, by a device, that a channel is to be used to transmit an advertisement;

determining, by the device, a channel-specific gain associated with transmitting the advertisement via the channel; and generating, by the device, the advertisement to include information identifying a channel identifier of the channel and the channel-specific gain, wherein generating the advertisement to include the information comprises:

including the channel identifier in a header of the advertisement channel; and including a value of the channel-specific gain in a payload of the advertisement channel; and transmitting, by the device, the advertisement for locationing based on a received signal strength indicator (RSSI) of the advertisement channel.

* * * * *